(12) United States Patent
Lu et al.

(10) Patent No.: US 9,176,753 B2
(45) Date of Patent: Nov. 3, 2015

(54) METHOD FOR SEARCHING FOR CLASS AND FUNCTION BASED ON .NET CARD AND .NET CARD THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 518 days.

(21) Appl. No.: 12/425,520

(22) Filed: Apr. 17, 2009

(65) Prior Publication Data

US 2009/0287688 A1 Nov. 19, 2009

(30) Foreign Application Priority Data

May 13, 2008 (CN) .......................... 2008 1 0106467

(51) Int. Cl.
*G06F 17/00* (2006.01)
*G06F 9/445* (2006.01)
*G06F 9/455* (2006.01)

(52) U.S. Cl.
CPC ........ *G06F 9/44521* (2013.01); *G06F 9/45504* (2013.01)

(58) Field of Classification Search
CPC .......................... G06F 9/44521; G06F 9/45504
USPC ........................................................ 707/741
See application file for complete search history.

(56) References Cited

U.S. PATENT DOCUMENTS

| | | | |
|---|---|---|---|
| 5,499,333 A * | 3/1996 | Doudnikoff et al. .......... | 715/234 |
| 2003/0105883 A1 | 6/2003 | Gibbons | |
| 2004/0040029 A1 | 2/2004 | Debbabi et al. | |

(Continued)

FOREIGN PATENT DOCUMENTS

| | | |
|---|---|---|
| CN | 1889038 A | 1/2007 |
| CN | 101419549 B | 4/2012 |

OTHER PUBLICATIONS

Microsoft .NET Guidelines, http://www.microsoft.com/en-us/legal/intellectualproperty/Trademarks/Usage/net.aspx, Sep. 9, 2014.*

(Continued)

*Primary Examiner* — Mariela Reyes
*Assistant Examiner* — Mohsen Almani
(74) *Attorney, Agent, or Firm* — Harness, Dickey & Pierce, P.L.C.

(57) ABSTRACT

The present invention relates to information security field and presents a method for searching for a class and a function based on a .NET card and a .NET card thereof. The method includes: building a first character string according to information of a class currently executed by the .NET card, or information of a function currently executed by the .NET card and a class that the function belongs to; computing a first index value from the first character string; searching for a first locator value corresponding to the first index value in an index table pre-stored in the .NET card, wherein index values in the index table are generated in the same way as the first index value is generated; finding, in a runtime library of the .NET card, the class or the function currently executed according to the first locator value. The .NET card includes a storage module, a building module, a computing module and a searching module. The invention improves the speed of searching for a class or a function when a program is executed in the .NET card. And the index table consumes a small part of the memory of the .NET card, therefore the method is convenient and easy to implement.

2 Claims, 3 Drawing Sheets

(56) References Cited

U.S. PATENT DOCUMENTS

2005/0198291 A1   9/2005   Hull et al.
2006/0136390 A1*  6/2006   Zhao et al. .................. 707/3
2008/0115117 A1*  5/2008   Wilkinson et al. ........... 717/139

OTHER PUBLICATIONS

French Search Report regarding Application No. 0952733, dated May 14, 2013. Translation provided by Unitalen Attorneys at Law.

* cited by examiner

METHOD FOR SEARCHING FOR CLASS AND FUNCTION BASED ON .NET CARD AND .NET CARD THEREOF

This application claims priority to Chinese patent application No. 200810106467.9, entitled "METHOD FOR SEARCHING FOR CLASS AND FUNCTION BASED ON .NET CARD AND .NET CARD THEREOF" and filed with the Chinese Patent Office on May 13, 2008, which is hereby incorporated by reference in its entirety.

FIELD OF THE INVENTION

The present invention relates to information security field, and more particularly, to a method for searching for a class and a function based on a .NET card and a .NET card thereof.

BACKGROUND OF THE INVENTION

As a new generation of technical platform of Microsoft, .NET is a new cross-language development platform based on the Internet, which conforms to the trend of software industry in the aspects such as distributed computing, component-oriented development or enterprise-oriented application, Software-as-a-Service and Web-centered development. Though .NET is not a developing language, the .NET development platform supports multiple developing languages such as C#, C++, Visual Basic, and Jscript.

With a similar size of a normal business card, a smart card is a plastic card containing a silicon chip with a diameter of about 1 cm, and has functions as storing information and complex computing. Smartcards are widely used in telephone cards, banking cards, identity identification cards, and in many fields such as mobile phones and prepaid TV. A smart card is regarded as the smallest computer in the world for its integration of microprocessor, storage and input/output unit on the chip of the smart card. Furthermore, with a strong security control mechanism, the security control program is fixed in read-only memory (ROM), which provides reliable guarantee of limited copying and password-guard read/write. Compared with a general magnetic card, the smart card has many advantages such as massive storage capacity and enhanced functions by using micro-processes.

.NET card is a microprocessor smart card including a .NET virtual machine where .NET programs can be executed. A virtual machine can be viewed as a software emulation of a machine with hardware such as processor, memory and register, by which various instructions can be emulated. There are no special requirements for the runtime environment by software running on the machine; hence the virtual machine is transparent to the programs running on it. For example, an x86 virtual machine emulates a runtime environment of x86 instructions and programs, and a c51 virtual machine emulates a runtime environment of c51 instructions and programs. The .NET card invokes classes and functions in a standard class library at the time of running the application programs.

A conventional way to search for a class is: first obtaining the class name and namespace of a class to be found, and then searching for the class in a standard class library one by one till the class in accordance with the class name and namespace is found. A conventional method for searching for a function is: first finding a class that the function belongs to, and then obtaining the name, returned result and parameter type of the function; and searching one by one for the function in accordance with the name, number of parameters and parameter type in the standard class library.

The conventional way to find a function does not meet requirements of .NET cards because of limited memory and the low operation speed of .NET cards.

SUMMARY OF THE INVENTION

In order to improve the speed of searching for a class or a function when a program is executed in a .NET card, the present invention provides a method for searching for a class and a function based on a .NET card and a .NET card thereof. The solution includes:

A method for searching for a class and a function based on a .NET card is provided, which is applied during execution of an assembly in the .NET card, including:

building a first character string according to information of a class currently executed by the .NET card, or information of a function currently executed by the .NET card and a class that the function belongs to;

computing a first index value from the first character string;

searching for a first locator value corresponding to the first index value in an index table pre-stored in the .NET card, wherein index values in the index table are generated in the same way as the first index value is generated;

finding the class or the function in a runtime library of the .NET card according to the first locator value.

The step of building the first character string according to the information of the class currently executed by the .NET card includes:

forming the first character string by a class name and a namespace of the class currently executed by the .NET card.

The step of building the first character string according to the information of the function currently executed by the .NET card and the class that the function belongs to includes:

forming the first character string by a class name and a namespace of the class that the function currently executed by the .NET card belongs to, a function name of the function, and a classname and a namespace of each parameter of the function.

The method further includes:

if the first index value is not included in the index table, building a second character string according to information of a superclass of a current class and the information of the function, with the class that the function currently executed by the .NET card belongs to as the current class, and computing a second index value from the second character string;

determining whether the second index value is included in the index table;

if so, searching for a second locator value corresponding to the second index value in the index table, and finding the class currently executed by the .NET card in the runtime library of the .NET card according to the second locator;

otherwise, performing a process which is the same as the process of obtaining the second index value with the superclass as a current class until a third index value which is included in the index table is found, searching for a third locator value corresponding to the third index value in the index table, and finding the class currently executed by the .NET card in the runtime library of the .NET card according to the third locator value.

The index table is stored in the assembly in the .NET card.

A .NET card is provided, including:

a storage module adapted to store an assembly and an index table;

a building module adapted to build a first character string according to information of a class currently executed, or information of a function currently executed and a class that the function belongs to, when the .NET card executes the assembly stored in the storage module;

a computing module adapted to compute a first index value from the first character string generated by the building module;

a searching module adapted to search for a first locator value corresponding to the first index value obtained by the computing module in the index table stored in the storage module, wherein index values in the index table are generated in the same way as the first index value is generated; and to find a class or a function in a runtime library of the .NET card according to the first locator value.

Specifically, the building module includes:

a first building unit adapted to form the first character string by a class name and a namespace of the class currently executed by the .NET card when the .NET card executes the assembly stored in the storage module.

The building module comprises:

a second building unit adapted to form the first character string by a class name and a namespace of the class that the function currently executed by the .NET card belongs to, a function name of the function, a class name and a namespace of each parameter of the function, when the .NET card executes the assembly stored in the storage module.

The building module is further adapted to, if the first index value obtained by the computing module is not included in the index table, with the class that the function currently executed by the .NET card belongs to as a current class, build a second character string according to information of a superclass of the current class and the information of the function;

the computing module is further adapted to compute a second index value from the second character string generated by the building module;

accordingly, the .NET card further comprises:

a determining module adapted to determine whether the second index value obtained by the computing module is included in the index table; and the searching module is further adapted, if the second index value obtained by the computing module is included in the index table, to search for a second locator value corresponding to the second index value in the index table, find the class currently executed by the .NET card in the runtime library of the .NET card according to the second locator value; and if the second index value obtained by the computing module is not included in the index table, to perform a process which is the same as the process of obtaining the second index value with the superclass as a current class until a third index value which is included in the index table is found, search for a third locator value corresponding to the third index value in the index table, and find the class currently executed by the .NET card in the runtime library of the .NET card according to the third locator value.

The .NET card, wherein the index table is stored in the assembly in the .NET card.

According to the present invention, a class or a function to be found is located by building a character string and according to a pre-stored index table, which improves the speed of searching for the class or the function to be invoked when a program is executed in a .NET card. The index table consumes a small part of the memory of the .NET card, therefore the method is convenient and easy to implement. In addition, for derived functions and overriding functions, an index value can be found in the index table according to information of a superclass, thereby achieving successful location.

DETAILED DESCRIPTION OF THE INVENTION

Objects, technical solutions and advantages of the invention will be easily understood by reference to the following description of embodiments when read in conjunction with the accompanying drawings.

Embodiment 1

Figure 1:
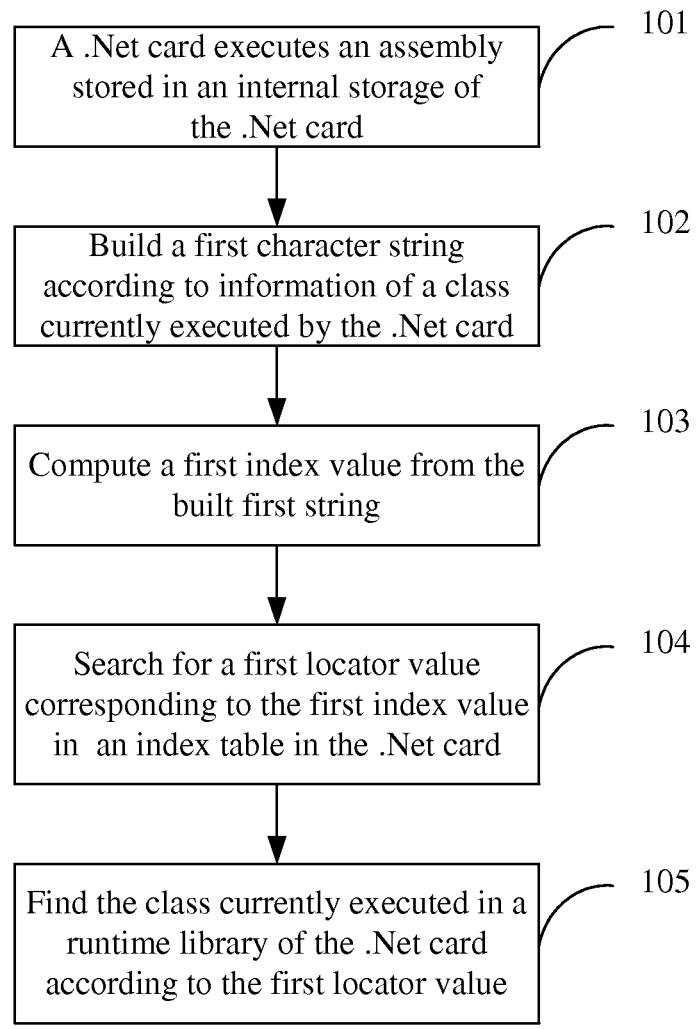
FIG. 1 is a flow chart illustrating a method for searching for a class and a function based on a .NET card according to a first embodiment of the invention.

Referring to FIG. 1, the embodiment of the present invention provides a method for searching for a class and a function based on a .NET card, which is applied during execution of an assembly in the .NET card. A method for searching for a class is illustrated in the embodiment, including:

Step 101: The .NET card is connected to a computer via a card reader or remote access. The .NET card executes the assembly stored in the internal storage of the .NET card. An index table, which is pre-stored in the .NET card, includes index values and corresponding locator values for searching for a class or a function in a class library. For example, an index value of a class Class1 in the index table is 1, a locator value corresponding to the index value is Token1=0x11. The locator value 0x11 corresponds to entity content of the class Class1 in the class library of the .NET card.

Step 102: A first character string is built according to information of a class currently executed by the .NET card.

Specifically, the first character string can be formed by a class name and a namespace of the class currently executed by the .NET card. For example, the class currently executed is Class1, the namespace of which is NameSpace1, then the built first character string can be NameSpace1.Class1

Step 103: A first index value is computed from the built first character string.

Specifically, the first character string above is hashed by using a hash algorithm to obtain a hash value of the class currently executed. With the hash value modulo operation is performed on the total number of classes and functions corresponding to the index values in the index table, so as to obtain a first index value.

Step 104: According to the obtained first index value, a first locator value corresponding to the first index value is searched for in the index table.

In the present embodiment, the index values in the .NET card are generated in the same way as the first index value is generated. Generally, the index table includes index values corresponding to all of the classes and functions invoked by the assembly in the .NET card. In addition, the index table can be stored in the assembly in the .NET card.

Step 105: The class currently executed is found in a runtime library of the .NET card according to the obtained first locator value, and the entity of the class is invoked.

The runtime library of the .NET card, which can include part or all of the content of a standard class library, includes all of the classes and functions related to the assembly in the .NET card. Generally the runtime library and the .NET card are provided to the user together.

In the embodiment, the class can be located successfully by one time of searching to be invoked.

In the embodiment, the class to be found is located by building a character string and according to a pre-stored index table, which improves the speed of searching for the class to be invoked when a program is executed in the .NET card. The index table accounts a small part of the memory of the .NET card, therefore the method is convenient and easy to implement.

Embodiment 2

Figure 2:
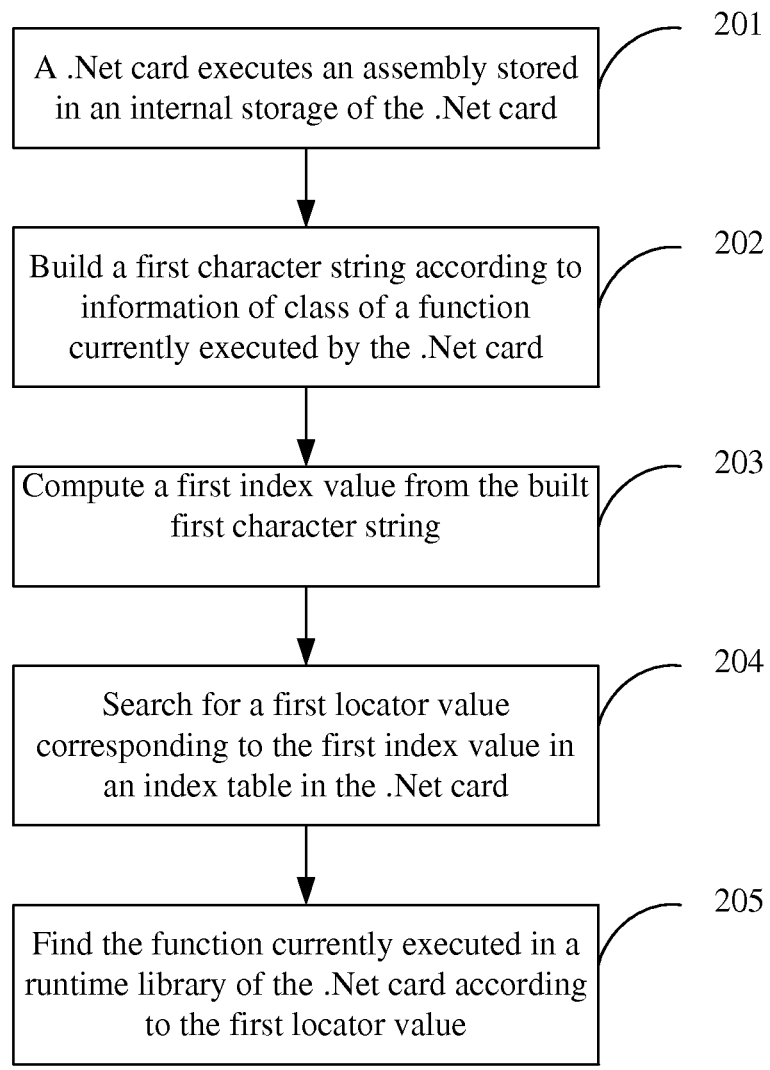
FIG. 2 is a flow chart illustrating a method for searching for a class and a function based on a .NET card according to a second embodiment of the invention.

Referring to FIG. 2, the embodiment of the present invention provides a method for searching for a class and a function based on a .NET card, which is applied during execution of an assembly in the .NET card. The present embodiment illustrates a method for searching for a function, including:

Step 201: The .NET card is connected to a computer via a card reader or remote access. The .NET card executes the assembly stored in the internal storage of the .NET card. An index table, which is pre-stored in the .NET card, includes index values and corresponding locator values for searching for a class or a function in a class library.

Step 202: A first character string is built according to information of a class that a function currently executed by the .NET card belongs to.

Specifically, the first character string can be formed by a class name and a namespace of the class that the function currently executed by the .NET card belongs to, a function name of the function, and a class name and a namespace of each parameter of the function. For example, a function currently executed is MyFunc1, a class that the function belongs to is Class1, a namespace of the class is NameSpace1. The function contains two parameters: NameSpace2.Class3 and NameSpace3.Class5. So a first character string can be built as following:

NameSpace1.Class1 (MyFunc1) NameSpace2.Class3, NameSpace3.Class5

Restrictive symbols can be added to the first character string to separate each part. For example, brackets can be used for the name of the function, commas for separating the parameters etc. In this way, confusion between the obtained first character string and other character strings can be avoided.

Step 203: A first index value is computed from the built first character string.

Specifically, the first character string above is hashed by using a hash algorithm to obtain a hash value of the function currently executed. With the hash value modulo operation is performed on the total number of classes and functions corresponding to the index values in the index table, so as to obtain a first index value.

Step 204: According to the obtained first index value, a first locator value corresponding to the first index value is searched for in the index table.

In the present embodiment, the index values in the .NET card are generated in the same way as the first index value is generated. Generally, the index table includes index values corresponding to all of the classes and functions invoked by the assembly in the .NET card. In addition, the index table is stored in the assembly in the .NET card.

Step 205: The function currently executed is found in a runtime library of the .NET card according to the first locator value, and the entity of the function is invoked.

The runtime library of the .NET card, which can include part or all of the content of a standard class library, includes all of the classes and functions related to the assembly in the .NET card. Generally the runtime library and the .NET card are provided to the user together.

In the embodiment, an overloaded function, or a function without being overloaded or derived can be located successfully by one time of searching. For a derived function or overriding function (i.e. virtual function), the first index table may not include the first index value. Furthermore, the method above includes:

If the first index value is not included in the index table, a class of the function currently executed by the .NET card is regarded as the current class, a second character string is built according to information of a superclass and a function of the current class, and a second index value is computed from the second character string; it is determined whether the second index value is included in the index table; if so, a second locator value corresponding to the second index value is searched for in the index table, and the class currently executed by the .NET card is found in the runtime library of the .NET card according to the second locator value; otherwise, the superclass is regarded as the current class, and a process is performed which is the same as the process of obtaining the second index value till a third index value included in the index table is found, then a third locator value corresponding to the third index value is searched for in the index table, and the class currently executed by the .NET card is found in the runtime library of the .NET card according to the third locator.

For example, a function Func1 is to be found, and a class that the function belongs to is class Class1. If a first index value according to the class and function is not found in the index table, then a second index value is obtained according to the function and Class2 which is a superclass of Class1. If the index table does not include the second index value either, then a third index value is obtained according the function and Class3 which is a superclass of Class2. And so on and so forth, till an index value that can be found in the index table is obtained. Therefore, a corresponding locator value is found, and the function can be found in a class library according to the locator value.

In the embodiment, the function to be found is located by building a character string and according to a pre-stored index table, which improves the speed of searching for the function to be invoked when a program is executed in the .NET card. The index table consumes a small part of the memory of the .NET card, therefore the method is convenient and easy to implement. In addition, for derived functions and overriding functions, an index value can be found in the index table by multiple times of searching, thereby achieving successful location.

Embodiment 3

Figure 3:
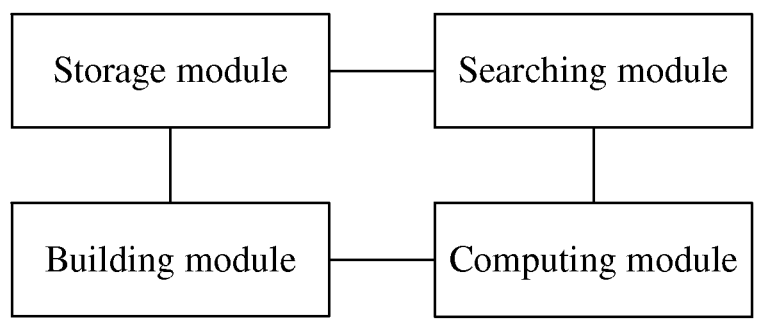
FIG. 3 is a structural diagram illustrating a .NET card according to a third embodiment of the invention.

Referring to FIG. 3, the embodiment of the present invention provides a .NET card which includes:

A storage module is adapted to store an assembly and an index table;

A building module is adapted to build a first character string according to information of a class currently executed, or information of a class that a function currently executed belongs to and information of the function, when the .NET card executes the assembly stored in the storage module;

A computing module is adapted to compute a first index value from the first character string generated by the building module;

A searching module is adapted to search for a first locator value corresponding to the first index value obtained by the computing module in the index table stored in the storage module. Index values in the index table are generated in the same way as the first index value is generated. The searching module is also adapted to find a class or a function in a runtime library of the .NET card according to the first locator value.

Specifically, the above building module includes:

a first building unit adapted to form the first character string by a class name and a namespace of the class currently executed by the .NET card when the .NET card executes the assembly stored in the storage module.

Or the above building module includes:

a second building unit adapted to form the first character string by a class name and a namespace of the class that the function currently executed by the .NET card belongs to, a function name of the function, and a class name and a namespace of each parameter of the function.

Furthermore, the computing module in FIG. 3 can include:

a hash operation unit adapted to perform hash operation on the first character string generated by the building module to obtain a hash value of the class or the function currently executed by the .NET card.

a modulo operation unit adapted to perform modulo operation on the total number of classes and functions corresponding to the index values in the index table with the hash value, to obtain the first index value.

In addition, the building module in FIG. 3 is also adapted to, with the class that the function currently executed by the .NET card belongs to as a current class, build a second character string according to information of a superclass of the current class and information of the function, if the first index value obtained by the computing module is not included in the index table; the computing module is also adapted to compute a second index value from a second character string generated by the building module.

Accordingly, the .NET card also includes:

a determining module adapted to determine whether the second index value obtained by the computing module is included in the index table; and if so, to search for a second locator value corresponding to the second index value in the index table, and find the class currently executed by the .NET card in the runtime library of the .NET card according to the second locator value;

otherwise, with the superclass as a current class, to perform a process which is the same as the process of obtaining the second index value until a third index value which is included in the index table is obtained, and search for a third locator value corresponding to the third index value in the index table, and find the class currently executed by the .NET card in the runtime library of the .NET card according to the third locator value.

In the present embodiment the index table can be stored in the assembly of the .NET card.

In the embodiment, the class or function to be found is located by building a character string and according to a pre-stored index table, which improves the speed of searching for the class or function when a program is executed in the .NET card. The index table consumes a small part of the memory of the .NET card, therefore the method is convenient and easy to implement. In addition, for derived functions and overriding functions, an index value can be found in the index table according to information of a superclass, thereby achieving successful location.

The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

What is claimed is:

1. A method for searching for a class and a function based on a microprocessor smart card based on .net technology, which is applied during execution of an assembly in the microprocessor smart card based on .net technology, wherein the assembly comprises groups of classes and functions, the method comprises:

building a first character string according to information of a class currently executed by the microprocessor smart card based on .net technology, or information of a function currently executed by the microprocessor smart card based on .net technology and a class that the function belongs to;

computing a first index value from the first character string, wherein the first character string is hashed to obtain a hash value of the class currently executed or the function currently executed, and the first index value is obtained with the hash value modulo operation being performed on the total number of classes and functions corresponding to the index values in the index table;

searching for a first locator value corresponding to the first index value in an index table pre-stored in the microprocessor smart card based on .net technology, wherein index values in the index table are generated in the same way as the first index value is generated, wherein, the index table includes index values and corresponding locator values, a locator value corresponds to entity content of a class or a function in the class library of the microprocessor smart card based on .net technology;

finding the class or the function in a runtime library of the microprocessor smart card based on .net technology according to the first locator value and invoking the entity of the class or the function;

the method further comprising:

if the first index value is not included in the index table, building a second character string according to information of a superclass of a current class and the information of the function, with the class that the function currently executed by the microprocessor smart card based on .net technology belongs to as the current class, and computing a second index value from the second character string;

determining whether the second index value is included in the index table;

if the second index value is included in the index table, searching for a second locator value corresponding to the second index value in the index table, and finding the class currently executed by the microprocessor smart card based on .net technology in the runtime library of the microprocessor smart card based on .net technology according to the second locator;

if the second index value is not included in the index table, performing a process which is the same as the process of obtaining the second index value with the superclass as a current class until a third index value which is included in the index table is found, searching for a third locator value corresponding to the third index value in the index table, and finding the class currently executed by the microprocessor smart card based on .net technology in the runtime library of the microprocessor smart card based on .net technology according to the third locator value;

wherein the step of building the first character string according to the information of the class currently executed by the microprocessor smart card based on .net technology comprises:

forming the first character string by a class name and a namespace of the class currently executed by the microprocessor smart card based on .net technology; or forming the first character string by a class name and a namespace of the class that the function currently executed by the microprocessor smart card based on .net technology belongs to, a function name of the function, and a class name and a namespace of each parameter of the function;

wherein the index table is stored in the assembly in the microprocessor smart card based on .net technology.

2. A microprocessor smart card based on .net technology, comprising:

a storage module, comprising a CPU coupled with a memory, configured to store an assembly and an index table, wherein, the assembly comprises groups of classes and functions, the index table includes index values and corresponding locator values for searching for a class or a function in a class library;

a building module, comprising a CPU coupled with a memory, configured to build a first character string according to information of a class currently executed, or information of a function currently executed and a class that the function belongs to, when the microprocessor smart card based on .net technology executes the assembly stored in the storage module;

a computing module, comprising a CPU coupled with a memory, configured to compute a first index value from the first character string generated by the building module, wherein the first character string is hashed to obtain a hash value of the class currently executed or the function currently executed, and the first index value is obtained with the hash value modulo operation being performed on the total number of classes and functions corresponding to the index values in the index table;

a searching module, comprising a CPU coupled with a memory, configured to search for a first locator value corresponding to the first index value obtained by the computing module in the index table stored in the storage module, wherein index values in the index table are generated in the same way as the first index value is generated, wherein, the index table includes index values and corresponding locator values, a locator value corresponds to entity content of a class or a function in the class library of the microprocessor smart card based on .net technology; to find a class or a function in a runtime library of the microprocessor smart card based on .net technology according to the first locator value; and to invoke the entity of the class or the function;

wherein the building module is further configured to, if the first index value obtained by the computing module is not included in the index table, with the class that the function currently executed by the microprocessor smart card based on .net technology belongs to as a current class, build a second character string according to information of a superclass of the current class and the information of the function;

the computing module is further configured to compute a second index value from the second character string generated by the building module;

accordingly, the microprocessor smart card based on .net technology further comprises:

a determining module, comprising a CPU coupled with a memory, configured to determine whether the second index value obtained by the computing module is included in the index table; and the searching module is further configured, if the second index value obtained by the computing module is included in the index table, to search for a second locator value corresponding to the second index value in the index table, find the class currently executed by the microprocessor smart card based on .net technology in the runtime library of the microprocessor smart card based on .net technology according to the second locator value; and if the second index value obtained by the computing module is not included in the index table, to perform a process which is the same as the process of obtaining the second index value with the superclass as a current class until a third index value which is included in the index table is found, search for a third locator value corresponding to the third index value in the index table, and find the class currently executed by the microprocessor smart card based on .net technology in the runtime library of the microprocessor smart card based on .net technology according to the third locator value;

wherein the building module comprises:

a first building unit, comprising a CPU coupled with a memory, configured to form the first character string by a class name and a namespace of the class currently executed by the microprocessor smart card based on .net technology when the microprocessor smart card based on .net technology executes the assembly stored in the storage module; or a second building unit, comprising a CPU coupled with a memory, configured to form the first character string by a class name and a namespace of the class that the function currently executed by the microprocessor smart card based on .net technology belongs to, a function name of the function, a class name and a namespace of each parameter of the function, when the microprocessor smart card based on .net technology executes the assembly stored in the storage module;

wherein the index table is stored in the assembly in the microprocessor smart card based on .net technology.

* * * * *